United States Patent
Zhang et al.

(10) Patent No.: US 11,395,101 B2
(45) Date of Patent: Jul. 19, 2022

(54) LOCATION-BASED APPLICATION DISCOVERY

(71) Applicant: Citrix Systems, Inc., Ft. Lauderdale, FL (US)

(72) Inventors: Xiao Zhang, Nanjing (CN); Ze Chen, Nanjing (CN); Jie Zhuang, Nanjing (CN); Zongpeng Qiao, Nanjing (CN)

(73) Assignee: Citrix Systems, Inc., Ft. Lauderdale, FL (US)

(*) Notice: Subject to any disclaimer, the term of this patent is extended or adjusted under 35 U.S.C. 154(b) by 0 days.

(21) Appl. No.: 16/851,373

(22) Filed: Apr. 17, 2020

(65) Prior Publication Data

US 2021/0227352 A1 Jul. 22, 2021

Related U.S. Application Data

(63) Continuation of application No. PCT/CN2020/073781, filed on Jan. 22, 2020.

(51) Int. Cl.
*H04W 24/00* (2009.01)
*H04W 4/029* (2018.01)
(Continued)

(52) U.S. Cl.
CPC .......... *H04W 4/029* (2018.02); *G06F 8/60* (2013.01); *H04W 4/022* (2013.01)

(58) Field of Classification Search
None
See application file for complete search history.

(56) References Cited

U.S. PATENT DOCUMENTS

| 8,412,237 B1* | 4/2013 | Ohme | H04W 4/027 |
| | | | 455/456.3 |
| 2004/0038688 A1* | 2/2004 | Zabawshyj | H04W 8/08 |
| | | | 455/456.3 |

(Continued)

FOREIGN PATENT DOCUMENTS

| CN | 103793264 | 5/2014 |
| CN | 108768689 | 11/2018 |

OTHER PUBLICATIONS

Written Opinion dated Oct. 30, 2020 for International Patent Application No. PCT/CN2020/073781, 4 pages.

(Continued)

*Primary Examiner* — Jinsong Hu
*Assistant Examiner* — Alexander J Yi
(74) *Attorney, Agent, or Firm* — Finch & Maloney PLLC

(57) ABSTRACT

A computer system and method for providing location-based application access is provided. For example, the computer system includes a processor configured to receive a connection request for access to a distributed workspace, the connection request including location information for a client device. The processor can access metadata for each of a plurality of location-based applications, the metadata including location information for each of the applications defining at least one physical location where each of the applications can be accessed. The processor can compare the location information against the metadata for each of the applications and determine one or more applications that match the location information for the client device. The processor then can organize each of the applications that have associated location information that matches the location information into a listing of available applications and transmit the listing of available applications for display to a user of the client device.

16 Claims, 11 Drawing Sheets

(51) Int. Cl.
*G06F 8/60* (2018.01)
*H04W 4/021* (2018.01)

(56) References Cited

U.S. PATENT DOCUMENTS

| | | | |
|---|---|---|---|
| 2012/0042036 A1* | 2/2012 | Lau | H04W 4/60 709/217 |
| 2018/0255042 A1 | 9/2018 | Ashiya et al. | |
| 2019/0141139 A1 | 5/2019 | Singhal | |

OTHER PUBLICATIONS

International Search Report dated Oct. 30, 2020 for International Patent Application No. PCT/CN2020/073781, 4 pages.

* cited by examiner

LOCATION-BASED APPLICATION DISCOVERY

CROSS-REFERENCE TO RELATED APPLICATIONS

This application claims the benefit under 35 U.S.C. § 120 as a continuation of PCT application no. PCT/CN2020/073781, titled "LOCATION-BASED APPLICATION DISCOVERY," filed on Jan. 22, 2020, which designates the United States. The aforementioned application is hereby incorporated herein by reference in its entirety.

BACKGROUND

In a typical distributed workspace system, application deployment is generally based upon a pre-defined policy and available user resources. As such, an end user is typically dependent upon a system administrator to define the policy and available resources such that the end user can access one or more applications in the distributed workspace.

SUMMARY

In an example, a computer system for providing location-based application access is provided. The system includes a memory, a network interface, and at least one processor coupled to the memory and the network interface. The at least one processor is configured to receive, from a client agent via the network interface, a connection request for access to a distributed workspace, the connection request including location information for a client device; access, from the memory, metadata for each of a plurality of applications, wherein the metadata includes location information for each of the plurality of applications defining at least one physical location where each of the plurality of applications can be accessed; compare the location information for the client device against the metadata for each of the plurality of applications; determine one or more of the plurality of applications that have associated location information that matches the location information for the client device; organize each of the determined one or more of the plurality of applications that have associated location information that matches the location information for the client device into a listing of available applications; and transmit, to the client agent via the network interface, the listing of available applications for display to a user of the client device.

Implementations of the computer system can include one or more of the following features.

In the computer system, the at least one processor can be further configured to receive, from the client agent via the network interface, updated location information for the client device and determine if the location of the client device has changed based upon the updated location information for the client device. In some examples of the computer system, the at least one processor is further configured to generate, in response to determining that the location of the client device has changed, an updated listing of available applications based upon the updated location information and transmit, to the client agent via the network interface, the updated listing of available applications for display to a user of the client device. In some additional examples of the computer system, the at least one processor being configured to generate the updated listing of available applications includes the at least one processor being configured to compare the updated location information for the client device against the metadata for each of the plurality of applications, determine one or more of the plurality of applications that have associated location information that matches the updated location information for the client device, and organize each of the determined one or more of the plurality of applications that have associated location information that matches the updated location information for the client device into the updated listing of available applications.

In the computer system, the memory can include an application store configured to store the plurality of applications. In some examples of the computer system, the application store is organized into a plurality of application groups, each of the plurality of application groups including group location information for defining at least one physical location where each of the plurality of applications in a particular group can be accessed from.

In the computer system, the location information for the client device can include at least one of global positioning system information and network connection information.

In another example, a method of providing location-based application access is provided. The method includes receiving, by at least one processor, a connection request from a client agent via network interface operably coupled to the at least one processor for access to a distributed workspace, the connection request including location information for a client device; accessing, by the at least one processor, metadata for each of a plurality of applications from a memory operably coupled to the at least one processor, wherein the metadata includes location information for each of the plurality of applications defining at least one physical location where each of the plurality of applications can be accessed from; comparing, by the at least one processor, the location information for the client device against the metadata for each of the plurality of applications; determining, by the at least one processor, one or more of the plurality of applications that have associated location information that matches the location information for the client device; organizing, by the at least one processor, each of the determined one or more of the plurality of applications that have associated location information that matches the location information for the client device into a listing of available applications; and transmitting, by the at least one processor, the listing of available applications for display to a user of the client device to the client agent via the network interface.

Implementations of the method can include one or more of the following features.

At least some of the examples of the method can include receiving, by the at least one processor, updated location information for the client device from the client agent via the network interface and determining, by the at least one processor, if the location of the client device has changed based upon the updated location information for the client device.

In some additional examples, the method includes generating, by the at least one processor, an updated listing of available applications based upon the updated location information in response to determining that the location of the client device has changed and transmitting, by the at least one processor, the updated listing of available applications for display to a user of the client device to the client agent via the network interface. In some additional examples, generating the updated listing of available applications includes comparing, by the at least one processor, the updated location information for the client device against the metadata for each of the plurality of applications; determining, by the at least one processor, one or more of the plurality of applications that have associated location information that matches the updated location information for the client device; and organizing, by the at least one processor, each of the determined one or more of the plurality of applications that have associated location information that matches the updated location information for the client device into the updated listing of available applications.

In at least some examples of the method, the memory can include an application store configured to store the plurality of applications. In some additional examples of the method, the application store is organized into a plurality of application groups, each of the plurality of application groups including group location information for defining at least one physical location where each of the plurality of applications in a particular group can be accessed from.

In at least some examples of the method, the location information for the client device includes at least one of global positioning system information and network connection information.

In another example, a non-transitory computer readable medium is provided. The non-transitory computer readable medium can store computer executable instructions to provide location-based application access. The computer executable instructions include instructions to receive a connection request from a client agent via a network interface operably coupled to at least one processor for access to a distributed workspace, the connection request including location information for a client device; access metadata for each of a plurality of applications from a memory operably coupled to the at least one processor, wherein the metadata includes location information for each of the plurality of applications defining at least one physical location where each of the plurality of applications can be accessed from; compare the location information for the client device against the metadata for each of the plurality of applications; determine one or more of the plurality of applications that have associated location information that matches the location information for the client device; organize each of the determined one or more of the plurality of applications that have associated location information that matches the location information for the client device into a listing of available applications; and transmit the listing of available applications for display to a user of the client device to the client agent via the network interface.

Implementations of the computer readable medium can include one or more of the following features.

In at least some examples of the computer readable medium, the instructions further include instructions to receive updated location information for the client device from the client agent via the network interface and determine if the location of the client device has changed based upon the updated location information for the client device. In some additional examples of the computer readable medium, the instructions further include instructions to generate an updated listing of available applications based upon the updated location information in response to determining that the location of the client device has changed and transmit the updated listing of available applications for display to a user of the client device to the client agent via the network interface. In some additional examples of the computer readable medium, the instructions to generate the updated listing of available applications include instructions to compare the updated location information for the client device against the metadata for each of the plurality of applications, determine one or more of the plurality of applications that have associated location information that matches the updated location information for the client device, and organize each of the determined one or more of the plurality of applications that have associated location information that matches the updated location information for the client device into the updated listing of available applications.

In at least some examples of the computer readable medium, the memory can include an application store configured to store the plurality of applications. In some additional examples of the computer readable medium, the application store is organized into a plurality of application groups, each of the plurality of application groups including group location information for defining at least one physical location where each of the plurality of applications in a particular group can be accessed from.

Still other aspects, examples and advantages of these aspects and examples, are discussed in detail below. Moreover, it is to be understood that both the foregoing information and the following detailed description are merely illustrative examples of various aspects and features and are intended to provide an overview or framework for understanding the nature and character of the claimed aspects and examples. Any example or feature disclosed herein can be combined with any other example or feature. References to different examples are not necessarily mutually exclusive and are intended to indicate that a particular feature, structure, or characteristic described in connection with the example can be included in at least one example. Thus, terms like "other" and "another" when referring to the examples described herein are not intended to communicate any sort of exclusivity or grouping of features but rather are included to promote readability.

BRIEF DESCRIPTION OF THE DRAWINGS

Various aspects of at least one example are discussed below with reference to the accompanying figures, which are not intended to be drawn to scale. The figures are included to provide an illustration and a further understanding of the various aspects and are incorporated in and constitute a part of this specification but are not intended as a definition of the limits of any particular example. The drawings, together with the remainder of the specification, serve to explain principles and operations of the described and claimed aspects. In the figures, each identical or nearly identical component that is illustrated in various figures is represented by a like numeral. For purposes of clarity, not every component may be labeled in every figure.

DETAILED DESCRIPTION

Figure 1:
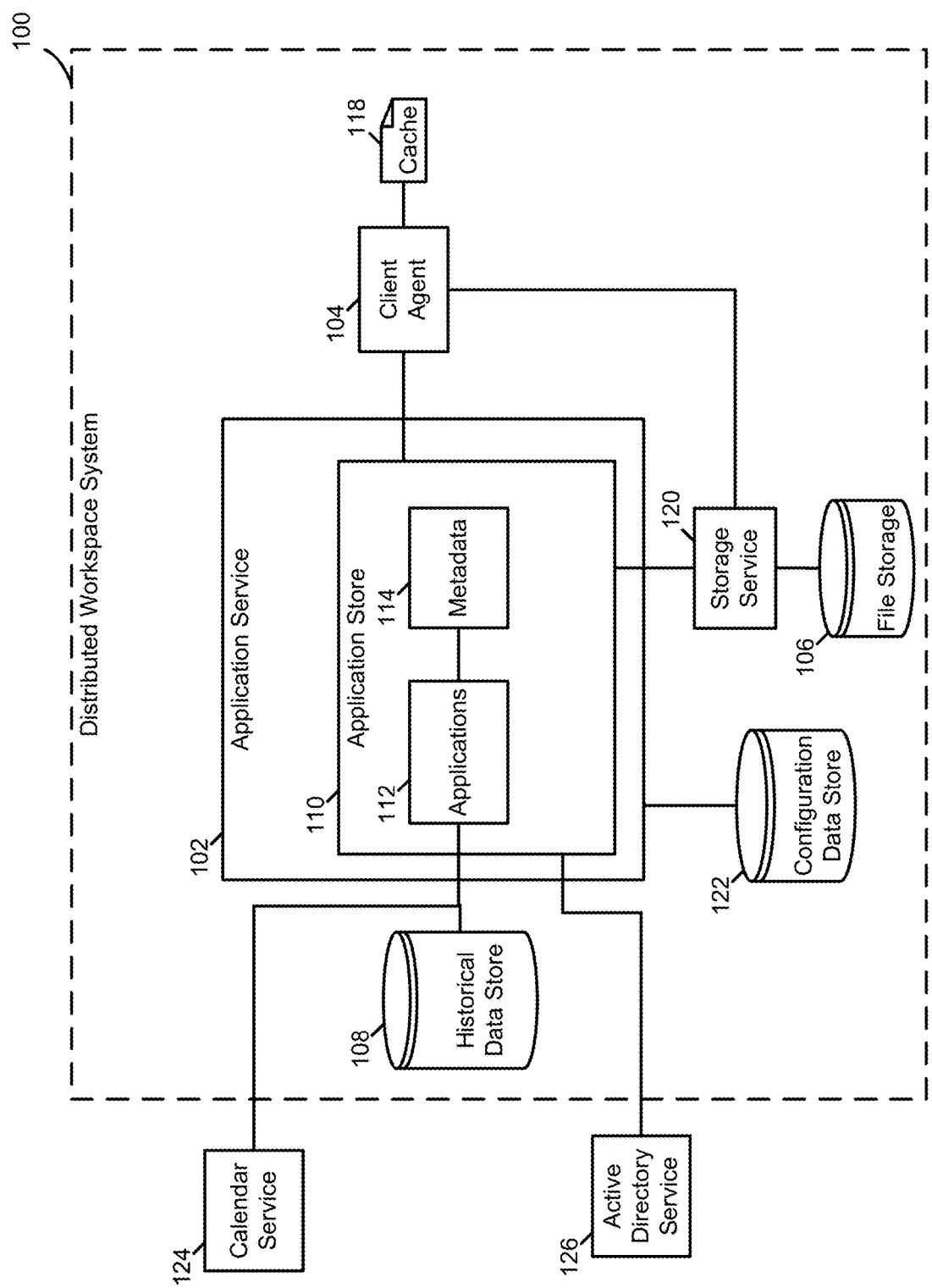
FIG. 1 is a block diagram of a distributed workspace system, in accordance with at least one example of the present disclosure.

As summarized above, various examples described herein are directed to systems for providing location-based application discovery and methods and processes for use of such a system in a distributed workspace system. These systems and methods overcome technical difficulties that arise in other distributed workspace systems where, for example, a server provides a user with a static set of applications for access in a distributed workspace. Such a traditional model is limited and generally only works well in controllable environments like an office where daily work and required resources are similar for all users and generally do not deviate from one day to the next. As such, traditional distributed workspace systems are not flexible based upon changing user resources and generally do not provide for dynamic access to applications. For example, as traditional distributed workspace systems do not consider the geographical location of a computing device, other distributed workspace systems are unable to improve the user interfaces they present by, for example, providing location-specific applications to a workspace user based upon the current location of the user and their associated computing device. The techniques as described herein provide added functionality to a user of a distributed workspace as the workspace can be automatically customized to a user's location, thereby increasing the efficiency of interaction between the user and the distributed workspace.

To improve a user's experience with a distributed workspace system, the system may include an application service that controls access to an application store. The application service can be configured to receive location information for a computing device that is requesting access to or is currently running an instance of a distributed workspace. The application service can match location information for the computing device against location information for one or more applications in the application store and provide access to those applications in the user's workspace. To update the available applications, the application service can continually receive updated location information for the computing device and update a listing of available applications as described herein.

The techniques as described herein for providing location-based application discovery can be implemented without impacting the user's standard interaction with their distributed workspace. For example, the user's workspace can include a static or fixed set of applications that the user has access to at any time from any location as well as a dynamic set of applications that can vary depending upon the user's current location. As described herein, the set of location-based applications can be specific to one or more aspects of the current location of the user and provide added functionality or features to the user's workspace when combined with the set of fixed applications.

Thus, and in accordance with at least some examples disclosed herein, distributed workspace systems, methods, and processes are provided that include location-based application discovery. These systems, methods, and processes enhance the quality of a user's experience by minimizing the impact and changes required on client-side software to implement the improved techniques.

In some examples, a processor associated with a server included in, for example, a distributed workspace system can receive a connection request for access to a distributed workspace, the connection request including location information for a client device that is submitting the request. The processor can access metadata for each of a set of applications from memory, the metadata including location information for each of the applications and defining at least one physical location where each of the applications can be accessed. The processor can compare the location information for the client device against the metadata for each of the applications and determine one or more of the applications that have associated location information that matches the location information for the client device. The processor can organize each of the determined applications that have associated location information that matches the location information for the client device into a listing of available applications. The listing of available applications can be transmitted to the client device for display in the user's distributed workspace. The client device can then prompt the user to select one or more of the listed applications to access.

As will be understood in view of this disclosure, a number of approaches to determining location information for a client device can be used. For example, the client device can be configured to provide location information such as global positioning system (GPS) information via, for example, a client agent in communication with a remote server. The client device can also be configured to provide network information such as IP address, Wi-Fi network name or ID, any Bluetooth beacon connectivity information, and other similar information that can be used to determine location information for the client device. Based upon this information, the application service running on the remote server can determine whether there are any location-based applications that should be provided to the user via their distributed workspace as based upon the current location of the client device.

Examples of the methods, systems, and processes discussed herein are not limited in application to the details of construction and the arrangement of components set forth in the following description or illustrated in the accompanying drawings. The methods and systems are capable of implementation in other examples and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Distributed Workspace System

In some examples, a distributed workspace system is configured to implement application access and file sharing to remote users of the workspace, thereby providing a central repository or store of application, files, and other similar resources to a group of trusted users. In certain systems, a central computing device such as a server can monitor a user's interaction with the system and limit the user's interactions to preapproved interactions and access for that particular user. Based upon a user's level of authentication, available resources, and other context information such as user location information as described herein below, the server can create a customized user interface interaction with the user, thereby enhancing the user's overall experience with the file sharing system.

FIG. 1 illustrates a logical architecture of distributed workspace system 100 in accordance with some examples. As shown, the system 100 includes an application service 102, a client agent 104, a file storage service 120, a centralized file storage 106, a configuration data store 122, an historical data store 108, and a local cache 118. The application service 102 can include an application store 110 configured to store, for example, information related to applications available for user access in the system 100. In examples, the application store 110 includes a listing of available applications 112 and associated metadata 114 for each application. For example, the metadata 114 can include required resources for a particular application 112, a user-security level required for accessing a particular application, whether an application is automatically pushed to a user's distributed workspace, and other similar information. Also depicted in FIG. 1 are an active directory service 126 and a calendar service 124.

In some examples, the application service 102 is configured to communicate with the agent 104, the storage service 120, and the historical data store 108 by exchanging (i.e., transmitting and/or receiving) messages via one or more system interfaces (e.g., a web service application program interface (API), a web server interface, fibre channel interface, etc.). For instance, in some examples, one or more server processes included within the application service 102 exchange messages with various types of client processes via the systems interfaces. These client process can include browsers and/or more specialized programs—such as the agent 104.

In certain examples, the messages exchanged between the sharing service 102 and a client process can include requests for authorization to access one or more of the applications 112. In some examples, the request can include access to one or more of the applications 112 in order to upload, download, share, and/or synchronize files. The messages can also include requests to authenticate users or devices and/or requests to configure features supported by the application service 102.

In these examples, the application service 102 is configured to respond to reception of an authorization request by communicating with the storage service 120 to determine, via a set of rules, whether an operation identified in the request is allowable. Further, in these examples, the application service 102 is configured to notify the client process (e.g., the agent 104) of the allowability of the requested operation via a response. In addition, the application service 102 is configured to maintain the historical data store 108 where the application service 102 receives a message from the storage service 120 that an authorized operation was successfully executed. The historical data store 108 is configured to store usage data consisting of records of each instance of file access involving the system 100. Records stored in the historical data store 108 can include an identifier of an application accessed, an identifier of a user accessing the application, an identifier of a file accessed, an identifier of a user accessing the file, an identifier of a client device accessing the file, a resource context through which the user accessed the file (as described in greater detail herein), and other similar historical data.

In some examples, the application service 102 is configured to respond to reception of an authentication request by communicating with an authentication service (e.g., the active directory service 126 of FIG. 1) to determine, via a set of rules, whether an entity (e.g., a user or device) identified in the authentication request is authorized to access the system 100. Further, in these examples, the application service 102 is configured to notify, via a response message, the client process as to whether the entity is authorized to access the system 100.

In some examples, the application service 102 is configured to respond to reception of a request to change its configuration by determining, via a set of rules, whether the change is allowable. Further, in these examples, the application service 102 is configured to execute the change where the change is allowable and notify the client process of the allowability and result of the requested change via a response. In at least one example, the application service 102 is configured to execute configuration changes by storing configuration data in the configuration data store 122. This configuration data can, for example, associate features (e.g., an automatic synchronization feature) with users, applications, files, and file directories.

In some examples, the storage service 120 is configured to manage the file storage 106. The file storage 106 is configured to store files serviced by the system 100. In some examples, the storage service 120 is configured to implement and expose a system interface (API) through which the other components of the system 100 access the file storage 106 and data descriptive of the files stored therein. For example, where the storage service 120 receives a request to execute an authorized, file-related operation, the storage service 120 responds to reception of the request by processing the request and notifying the requestor and the file sharing service 102 of the operations results. Further, in some examples, the storage service 120 is configured to load balance requests and responses received via the system interface.

In some examples, the agent 104 is a specialized client program configured to execute on a client device. The agent 104 manages the local cache 118. As shown in FIG. 1, the agent 104 is configured to interoperate with the sharing service 102 to implement the file-related and security features described above. In these examples, the agent 104 exchanges messages with the sharing service 102 via the system interfaces described above. The messages can include requests for authorization, authentication, and/or configuration as described above. Such messages can be generated, for example, by interaction between a user and a user interface provided by the agent 104.

In some examples, the agent 104 is configured to receive and process responses to authorization requests. These response can, for example, authorize the agent to launch an instance of one or more applications 112 via the user's distributed workspace. In such an example, the agent 104 can exchange messages with the application service 102 to execute the launching of one or more instances of one or more of applications 112. These responses can also, in some examples, authorize the agent 104 to execute a file-related operation, such as an upload, download, share, and/or synchronization. In response to receiving and processing an authorization response, the agent 104 can exchange messages with the storage service 120 to execute the authorized file-related operation. For instance, where the agent 104 receives a response authorizing download of a file, the agent 104 can exchange messages with the storage service 120 to request and receive the file as stored in the file storage 106. Conversely, where the agent 104 receives a response authorizing upload of a file, the agent 104 can exchange messages with the storage service 120 to transmit the file to the file storage 106.

In at least one example, where the application service 102 supports an automatic synchronization feature, the agent 104 exchanges messages with the application service 102 to configure the application service 102 to automatically launch one or more instances of applications 112 for particular user when the user accesses the system 100. When executing the automatic synchronization feature, the application service 102, the agent 104, and the file storage 106 interoperate with one another to automatically launch instances of any applications and associated files that may be targeted for automatic synchronization.

Figure 2:
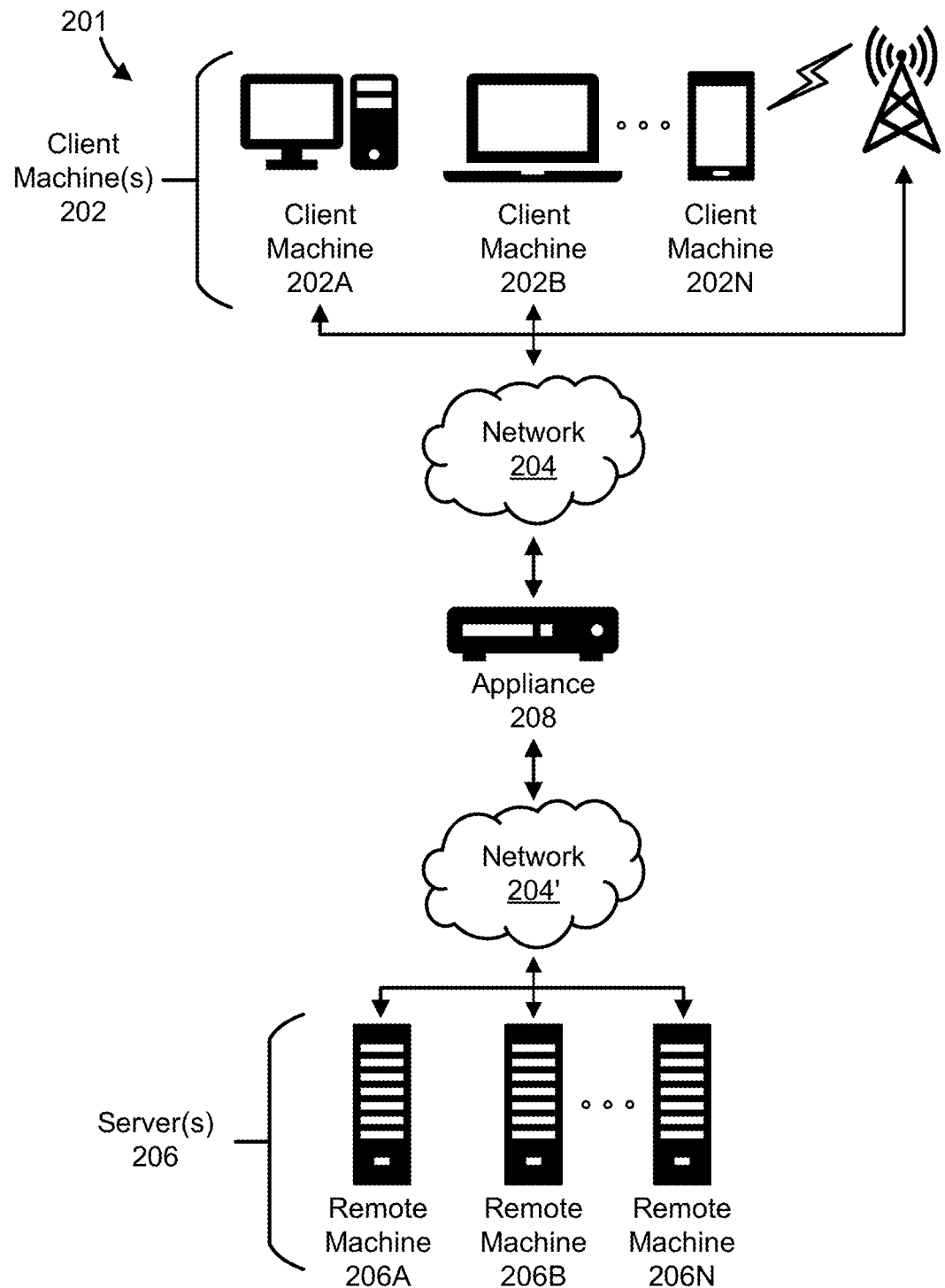
FIG. 2 is a block diagram of a network environment of computing devices in which various aspects of the present disclosure can be implemented.

Referring to FIG. 2, a non-limiting network environment 201 in which various aspects of the disclosure can be implemented includes one or more client machines 202A-202N, one or more remote machines 206A-206N, one or more networks 204, 204', and one or more appliances 208 installed within the computing environment 201. The client machines 202A-202N communicate with the remote machines 206A-206N via the networks 204, 204'. The computing environment 201 can also be referred to as a distributed computer system.

In some examples, the client machines 202A-202N communicate with the remote machines 206A-206N via an intermediary appliance 208. The illustrated appliance 208 is positioned between the networks 204, 204' and may also be referred to as a network interface or gateway. In some examples, the appliance 208 can operate as an application delivery controller (ADC) to provide clients with access to business applications and other data deployed in a datacenter, the cloud, or delivered as Software as a Service (SaaS) across a range of client devices, and/or provide other functionality such as load balancing, etc. In some examples, multiple appliances 208 can be used, and the appliance(s) 208 can be deployed as part of the network 204 and/or 204'.

The client machines 202A-202N may be generally referred to as client machines 202, local machines 202, clients 202, client nodes 202, client computers 202, client devices 202, computing devices 202, endpoints 202, or endpoint nodes 202. The remote machines 206A-206N may be generally referred to as servers 206 or a server farm 206. In some examples, a client device 202 can have the capacity to function as both a client node seeking access to resources provided by a server 206 and as a server 206 providing access to hosted resources for other client devices 202A-202N. The networks 204, 204' may be generally referred to as a network 204. The networks 204 can be configured in any combination of wired and wireless networks.

A server 206 can be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 206 can execute, operate, or otherwise provide an application that can be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft Internet Protocol telephone; an application for streaming video and/or audio; an application for facilitating real-time-data communications; a HyperText Transfer Protocol client; a File Transfer Protocol client; an Oscar client; a Telnet client; or any other set of executable instructions.

In some examples, a server 206 can execute a remote presentation services program or other program that uses a thin client or a remote-display protocol to capture display output generated by an application executing on a server 206 and transmit the application display output to a client device 202.

In yet other examples, a server 206 can execute a virtual machine providing, to a user of a client device 202, access to a computing environment. The client device 202 can be a virtual machine. The virtual machine can be managed by, for example, a hypervisor, a virtual machine manager (VMM), or any other hardware virtualization technique within the server 206.

In some examples, the network 204 can be: a local area network (LAN); a metropolitan area network (MAN); a wide area network (WAN); a primary public network 204; and a primary private network 204. Additional examples can include a network 204 of mobile telephone networks that use various protocols to communicate among mobile devices. For short range communications within a wireless local-area network (WLAN), the protocols can include 802.11, Bluetooth, and Near Field Communication (NFC).

Figure 3:
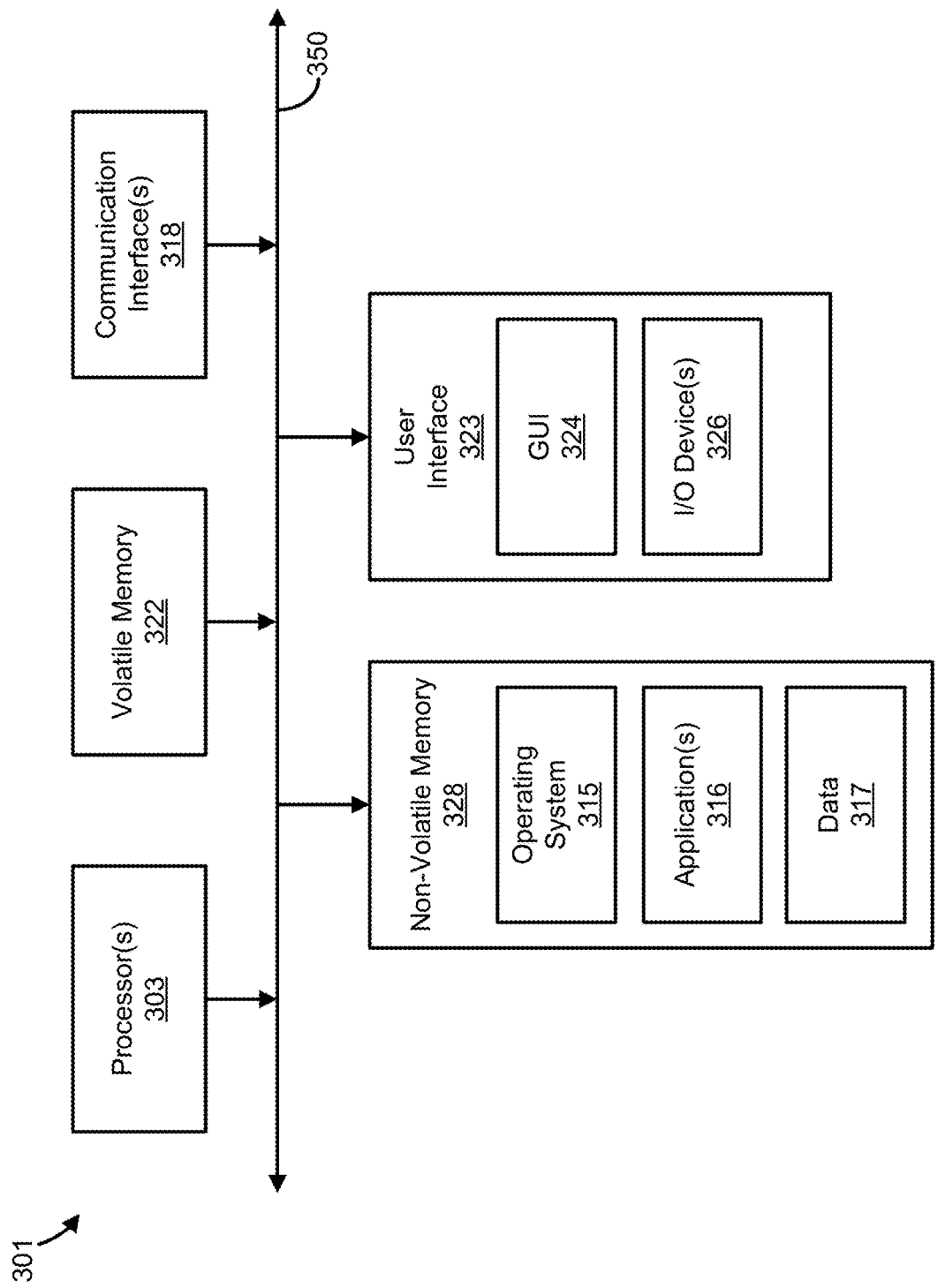
FIG. 3 is a block diagram of a computing device that can implement one or more of the computing devices of FIG. 2, in accordance with at least one example of the present disclosure.

FIG. 3 depicts a block diagram of a computing device 301 useful for practicing an example of client devices 202, appliances 208 and/or servers 206. The computing device 301 includes one or more processors 303, volatile memory 322 (e.g., random access memory (RAM)), non-volatile memory 328, user interface (UI) 323, one or more communications interfaces 318, and a communications bus 350. One or more of the computing devices 301 may also be referred to as a computer system.

The non-volatile memory 328 can include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

The user interface 323 can include a graphical user interface (GUI) 324 (e.g., a touchscreen, a display, etc.) and one or more input/output (I/O) devices 326 (e.g., a mouse, a keyboard, a microphone, one or more speakers, one or more cameras, one or more biometric scanners, one or more environmental sensors, and one or more accelerometers, etc.).

The non-volatile memory 328 stores an operating system 315, one or more applications 316, and data 317 such that, for example, computer instructions of the operating system 315 and/or the applications 316 are executed by processor(s) 303 out of the volatile memory 322. In some examples, the volatile memory 322 can include one or more types of RAM and/or a cache memory that can offer a faster response time than a main memory. Data can be entered using an input device of the GUI 324 or received from the I/O device(s)

326. Various elements of the computing device 301 can communicate via the communications bus 350.

The illustrated computing device 301 is shown merely as an example client device or server and can be implemented by any computing or processing environment with any type of machine or set of machines that can have suitable hardware and/or software capable of operating as described herein.

The processor(s) 303 can be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations can be hard coded into the circuitry or soft coded by way of instructions held in a memory device and executed by the circuitry. A processor can perform the function, operation, or sequence of operations using digital values and/or using analog signals.

In some examples, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multicore processors, or general-purpose computers with associated memory.

The processor 303 can be analog, digital or mixed. In some examples, the processor 303 can be one or more physical processors, or one or more virtual (e.g., remotely located or cloud) processors. A processor including multiple processor cores and/or multiple processors can provide functionality for parallel, simultaneous execution of instructions or for parallel, simultaneous execution of one instruction on more than one piece of data.

The communications interfaces 318 can include one or more interfaces to enable the computing device 301 to access a computer network such as a Local Area Network (LAN), a Wide Area Network (WAN), a Personal Area Network (PAN), or the Internet through a variety of wired and/or wireless connections, including cellular connections.

In described examples, the computing device 301 can execute an application on behalf of a user of a client device. For example, the computing device 301 can execute one or more virtual machines managed by a hypervisor. Each virtual machine can provide an execution session within which applications execute on behalf of a user or a client device, such as a hosted desktop session. The computing device 301 can also execute a terminal services session to provide a hosted desktop environment. The computing device 301 can provide access to a remote computing environment including one or more applications, one or more desktop applications, and one or more desktop sessions in which one or more applications can execute.

Figure 4:
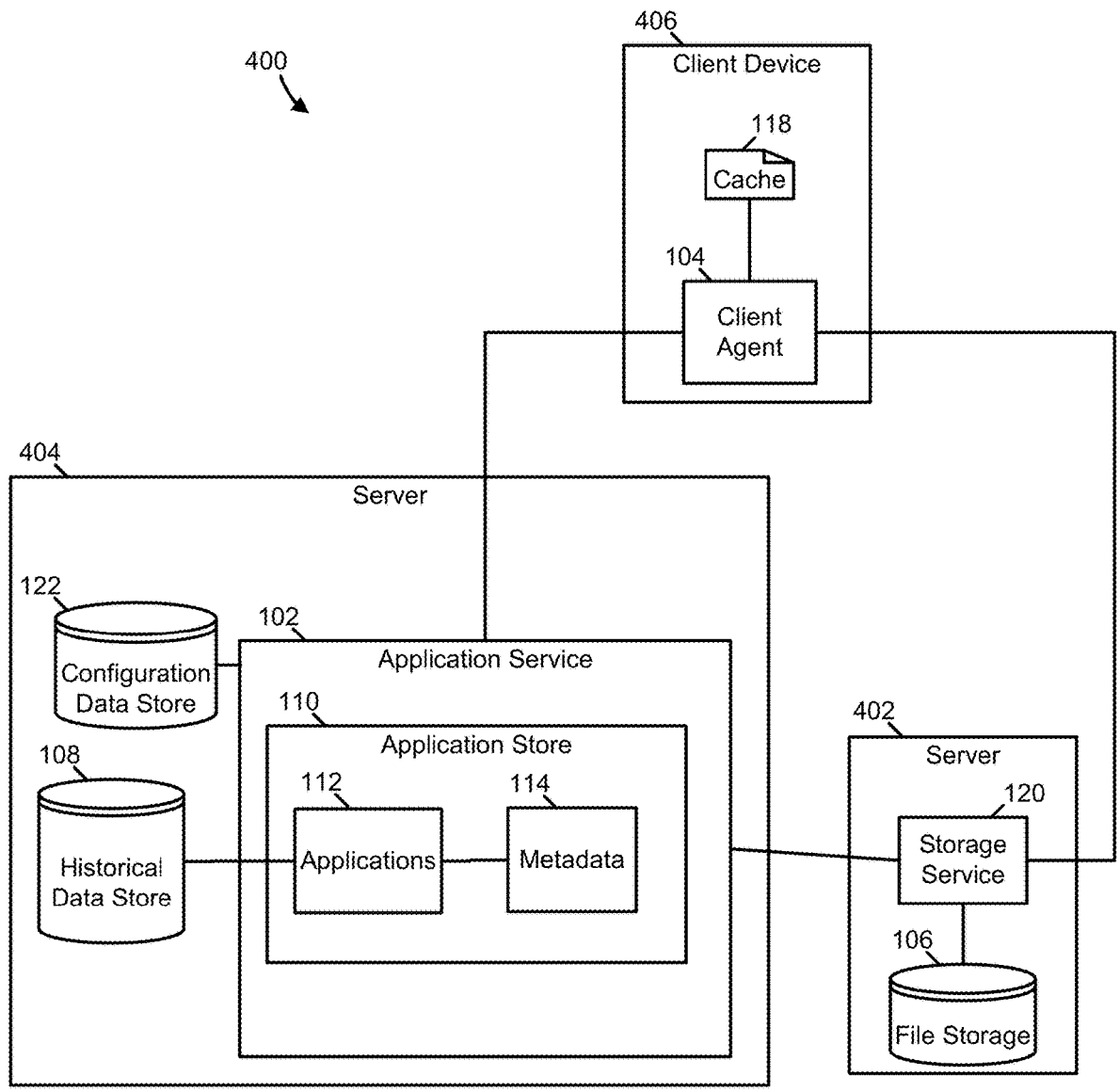
FIG. 4 is a block diagram of the distributed workspace system of FIG. 1 as implemented by a configuration of computing devices, in accordance with at least one example of the present disclosure.

FIG. 4 illustrates an enhanced distributed workspace and file sharing system (e.g., the system 100 of FIG. 1) configured for operation within a distributed computing platform (e.g. the network environment 201 of FIG. 2). As shown in FIG. 4, the configuration 400 includes a server computer 402, a server computer 404, and a client device 406. Within the configuration 400, the computing devices 402, 404, and 406 are communicatively coupled to one another and exchange data via a network (e.g., the networks 204 and 204' of FIG. 2).

As shown in FIG. 4, the server 402 hosts the storage service 120 and the file storage 106. The server 404 hosts the application service 102 and the historical data store 108. Some examples of processes performed by or involving server 404, including location-based application discovery as described herein, are described further below in reference to FIGS. 5-10. The client device 406 hosts the agent 104 which maintains the cache 118. Many of the components illustrated in FIG. 4 are described above with reference to FIG. 1. For purposes of brevity, those descriptions will not be repeated here, but each of the components of FIG. 1 included in FIG. 4 are structured and function in FIG. 4 as described in FIG. 1.

The configuration 400 is but one example of many potential configurations that can be used to implement the system 100. For example, in some examples, the server 404 hosts the file sharing service 102, the historical data store 108, the storage service 120, the configuration data store 122 and the file storage 106. However, in other examples, a server distinct from the servers 402 and 404 hosts the historical data store 108 and yet another distinct server hosts the file predictor 112. As such, the examples disclosed herein are not limited to the configuration 400 and other configurations are considered to fall within the scope of this disclosure.

Location-Based Application Discovery

As noted above, to improve or to provide a more specific set of applications based upon a computing device's current location, location-based application discovery can be used. To improve the listing of available applications that are provided to a user, it can be beneficial to match the current location of the user (and, by association, the user's computing device) with any location-based information associated with one or more applications as described herein.

Figure 5:
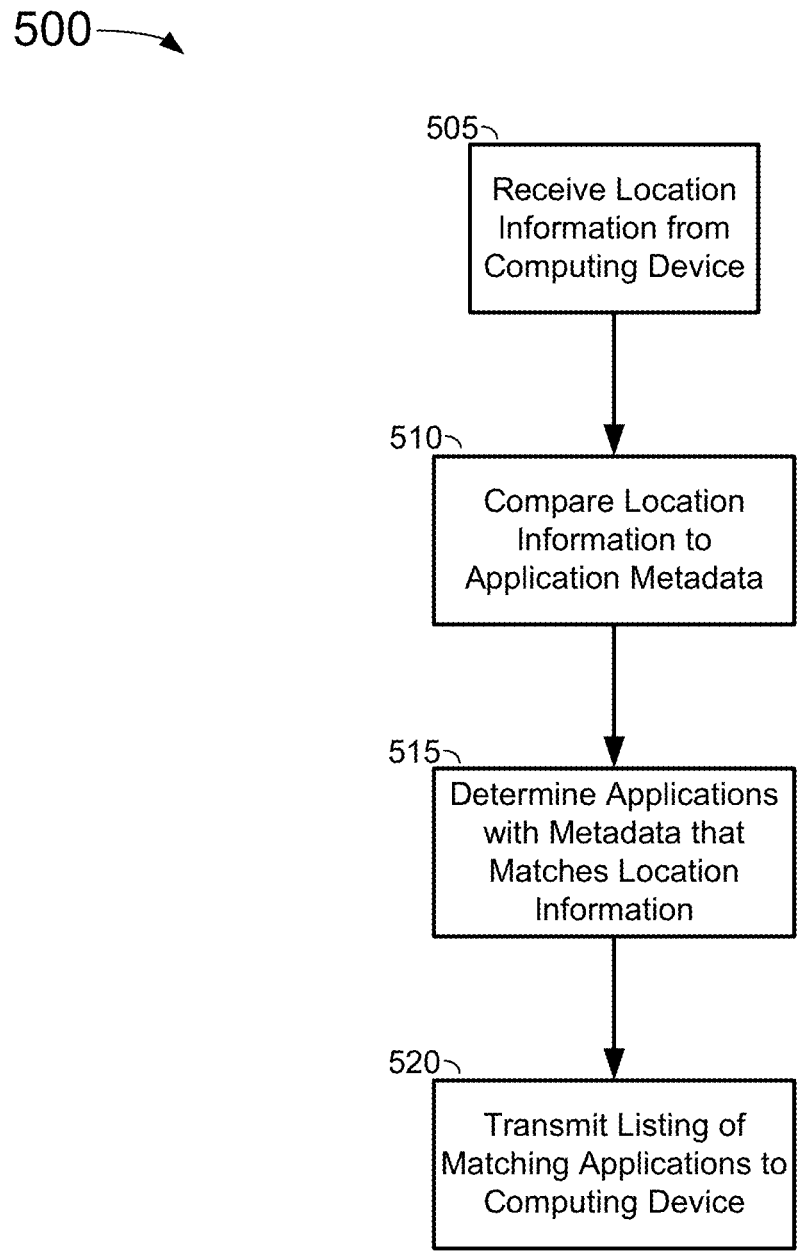
FIG. 5 is a flow diagram illustrating an initial location-based application discovery process for a user, in accordance with at least one example of the present disclosure.

FIG. 5 is a flow chart illustrating a process 500 for location-based application discovery. For example, process 500 can be implemented by a server such as server 404 as shown in FIG. 4 and described above, the server implementing an application service such as application service 102 as described herein. As shown in FIG. 5, process 500 can include receiving 505 location information from a computing device. For example, the computing device can include client device 406 as shown in FIG. 4 and described above. Upon accessing, for example, a distributed workspace system such as system 100, the computing device can provide data to the server, the data including location information. For example, the location information can include GPS information, network specific information such as Wi-Fi network identification information, and other similar location information.

The server can receive the location information and the application service can compare 510 the location information to metadata for one or more applications associated with, for example, an application store accessible by the application service. The metadata for the one or more applications can include location information for each application, the application location information including one or more indicators of specific geographic locations that are associated with distribution of and user access to the one or more applications. For example, a specific application such as an email service can include location information that indicates the application can be accessed from any geographic location. Other applications such as a shopping application for a specific store can include location information that indicates the application can be accessed from a Wi-Fi network provided by the store or at a specific geographic location (e.g., within 100 feet of the store's location).

The application service can compare 510 the received location information for the computing device and the application metadata to determine 515 one or more applications with metadata that matches the location information. For example, as noted above, some applications can include metadata that indicates access is to be provided to the application at any location. Other applications can include more specific criteria such as requiring the computing device to be within a particular distance of a geographic location and/or connected to a particular network. Based upon the location information for the computing device and the application metadata, the application service can determine 515 a set of applications that the computing device can access based upon the current location of the computing device.

As further shown in FIG. 5, the application service can organize and transmit 520 a listing of matching applications to the computing device. Upon receipt via, for example, a client agent such as agent 104, the computing device can request that the application service launch an instance of one or more specific applications included on the transmitted listing. In some examples, the agent can be configured to work with the application service to automatically launch one or more applications on the listing.

In certain implementations, the application service can pre-launch a virtual application in the background of a distributed workspace for a client device when the device enters a specific geographic location using, for example, a SaaS system as described herein. In such an example, a particular user may not be required to actually download an application to their personal device. Rather, when the user enters a geographic location associated with a particular application as described herein, a virtual version of the application can be launched in the background of their distributed workspace and will become immediately available to the user.

Figure 11:
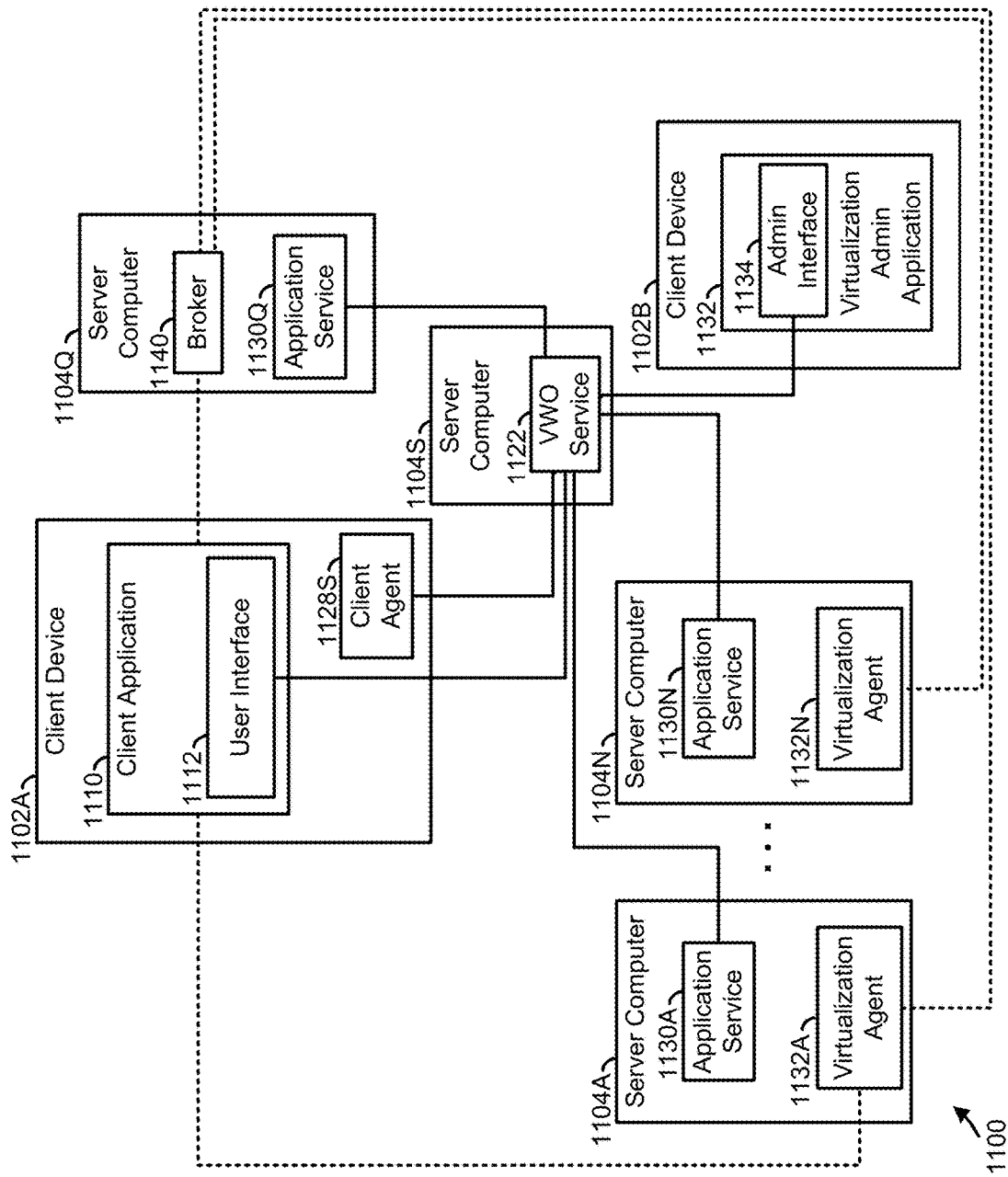
FIG. 11 is a block diagram of a workspace optimization system, in accordance with an example of the present disclosure.

For example, FIG. 11 illustrates a sample virtual workspace optimization system (VWO) 1100 that can be used to provide, for example, a SaaS system that incorporates automatic application launching or pre-launching based upon client device location information. In some examples, the system 1100 can be configured for operation within a distributed computing platform (e.g. system 100 as shown in FIG. 1). As shown in FIG. 11, the system 1100 also implements portions of SaaS system and includes the client devices 1102A and 1102B and server computers 1104A-1104S. Within the configuration 1100, the computer systems 1102A, 1102B, and 1104A-1104S are communicatively coupled to one another and exchange data via a one or more networks.

As illustrated in FIG. 11, the client device 1102A can be configured to host the client application 1110, a user interface 1112, and a client agent 1128S (e.g., client agent 104 of FIG. 1). The client device 1102B can be configured to host, for example, an administrative application 1132 and an administrative interface 1134. The server computer 1104A can be configured to host an application service 1130A (e.g., application service 110 of FIG. 1) and a virtualization agent 1132A, e.g., an agent configured to launch one or more instances of a virtual application for access by one or more client devices. The server computer 1104N can be configured to host an application service 1130N and a virtualization agent 1132N. The server computer 1104Q can be configured to host an application service 1130Q and a virtual resource broker 1140. The server computer 1104S can be configured to host a VWO service 1122 (e.g., a location-based application service as described herein).

In the example of FIG. 11, application service processes that constitute location-based application services as described herein can include the client application 1110, the virtualization agents 1132A-1132N, and the virtual resource broker 1140. As shown in FIG. 11, the virtualization agents interoperate with a load balancer (e.g., the broker 1140) to register and update the computing resources available for allocation to virtual resources such as virtual instances of location-based applications.

As shown in FIG. 11, the client application 1110 can interoperate with the virtualization agent 1132A to provide a user access to virtual resources hosted by the server computer 1104A. In some examples, to allocate and connect to virtual resources such as instances of virtual applications, the client application 1110 can interoperate with the broker 1140 via APIs implemented by the broker 1140. In one such interoperation, the client application 1110, via, for example, the client agent 1128S, can request access to a virtual resource, and the broker 1140 identifies connection information for the virtual resource and returns the connection information to the client application 1110. In response to receiving the connection information, the client application 1110 interoperates with the virtualization agent 1132A to establish a connection to the requested virtual resource.

For example, the client device 1102A can enter a specific geographic region associated with a location-based application hosted by server computer 1104A. The client agent 1128S can be configured to transmit the geographic location of the client device 1102A to, for example, server computer 1104Q. The broker 1140 can receive the location information including the geographic location of client device 1102A and determine which location-based applications are associated with the location information. Based upon the determination, the broker 1140 can establish one or more connections between the client agent 1128S and an appropriate application service. For example, server computer 1104A may be configured to host an application associated with a particular store that the client device 1102A is approaching. Based upon the current location information for the client device 1102A, the broker 1140 can establish a connection between the application service 1130A on the server computer 1104A and the client agent 1128S on the client device. The client agent 1128S can receive, for example, a list of location-based applications available from application service 1130A as described herein. Additionally, in some implementations, the application service 1130A can pre-launch one or more location-based applications using the virtualization agent 1132A such that, if requested by the client application 1110 of the client device 1102A, an instance of the virtual application is already running and the user of the client device experiences little to no delay in accessing the virtual application. When the client device 1102A leaves the geographic location associated with one or more applications associated with application service 1130A, the virtual instances of those applications, if pre-launched, can be terminated or virtually assigned to another client device in that geographic location. Additional information related to determining location-based applications is provided in the following discussions of FIGS. 6-10.

Other application services as illustrated in FIG. 11 interoperate with one another to prepare for requests for location-based applications. For instance, in some examples, during initialization the virtualization agents 1132A-1132N interoperate with the broker 1140 to register the server computers 1104A-1104N with the broker 1140.

Figure 6:
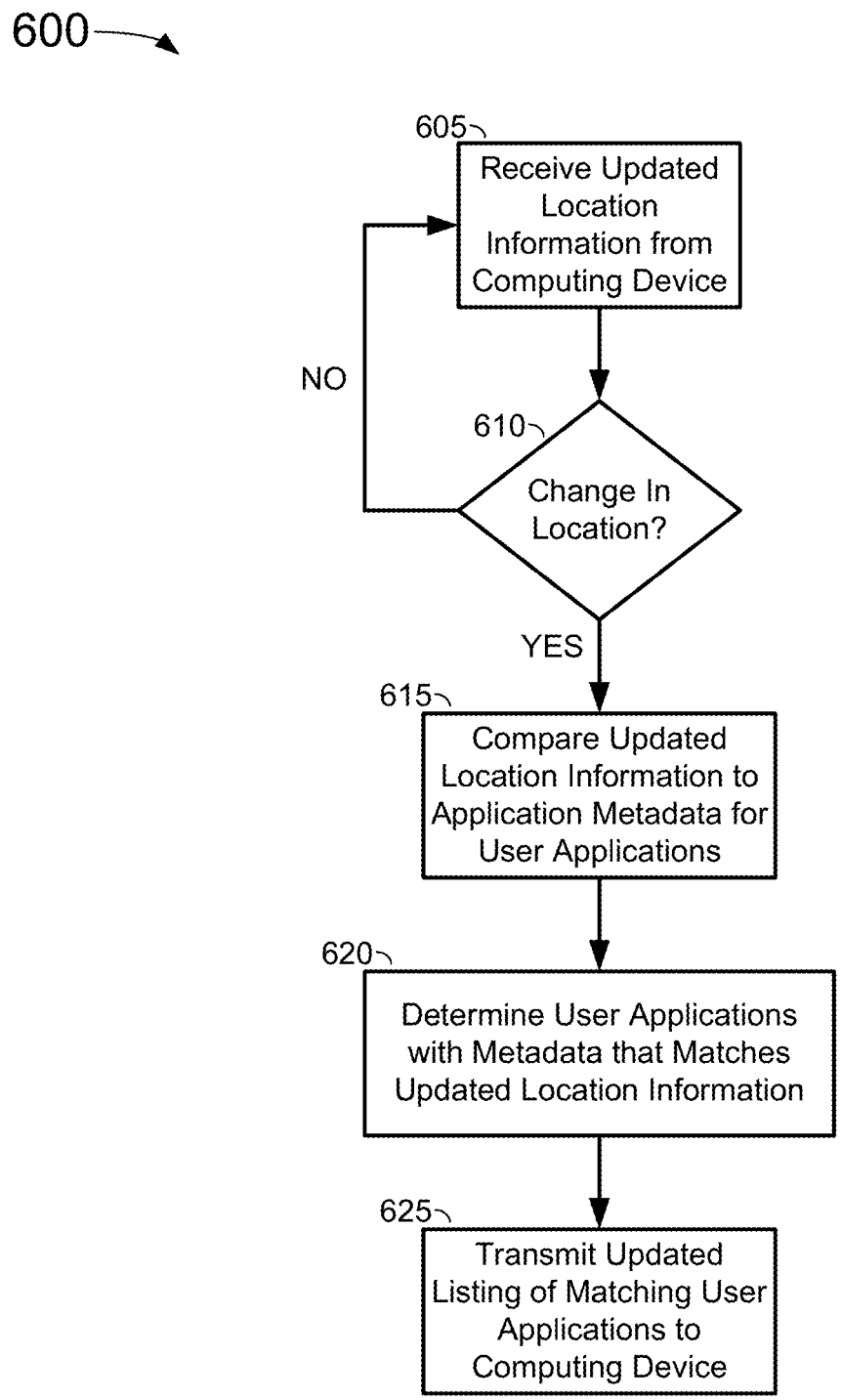
FIG. 6 is a flow diagram illustrating a continued location-based application discovery process for a user, in accordance with at least one example of the present disclosure.

In some examples, a user and their associated computing device may be moving and, as such, the location information for the computing device can change over time. FIG. 6 is a flow chart illustrating a process 600 for updated location-based application discovery. Similar to process 500 as described above in regard to FIG. 5, process 600 can be implemented by a server such as server 404 as shown in FIG. 4 and described above, the server implementing an application service such as application service 102 as described herein.

As shown in FIG. 6, process 600 can include receiving 605 updated location information from a computing device. For example, the computing device can include client device 406 as shown in FIG. 4 and described above. During connection to, for example, a distributed workspace system such as system 100, the client agent can be configured to provide updated location information on a set schedule. For example, the client agent can be configured to provide updated location information every 30 seconds, every minute, every two minutes, every five minutes, and every ten minutes. In some examples, the client agent can be configured to provide updated location information when the location information changes for the computing device, thereby indicating a change in location of the computing device. For example, as noted above, the location information can include GPS information, network specific information such as Wi-Fi network identification information, and other similar location information. In certain implementations, the server can provide a threshold or other similar amount of geographic change that is required for the client agent to report a change. For example, the server can provide a threshold of 100 meters. If the client device moves by more than 100 meters, the client agent can provide the updated location information to the server.

The server can receive the updated location information and the application service can determine 610 if the location of the client device has changed. If the application service determines that the location has not changed, the application service can continue to receive 605 updated location information. If the application service does determine 610 that the location information has changed, the application service can compare 615 the updated location information to the metadata, including application location information as described above, for one or more applications associated with, for example, an application store accessible by the application service.

The application service can compare 615 the received updated location information for the computing device and the application metadata to determine 620 one or more new applications with metadata that matches the updated location information should be added to the available application listing. Similarly, the application service can compare 615 the updated location information against the location information for the applications already included on the available application listing to determine if, for example, any applications already listed on the existing application listing should be removed from the listing. Based upon the updated location information for the computing device and the application metadata, the application service can determine 620 an updated set of applications that the computing device can access based upon the current location of the computing device.

As further shown in FIG. 6, the application service can organize and transmit 625 an updated listing of matching applications to the computing device. Upon receipt via, for example, a client agent such as agent 104, the computing device can request that the application service launch an instance of one or more specific applications included on the transmitted updated listing. In some examples, the agent can be configured to work with the application service to automatically launch one or more applications on the updated application listing.

Figure 7:
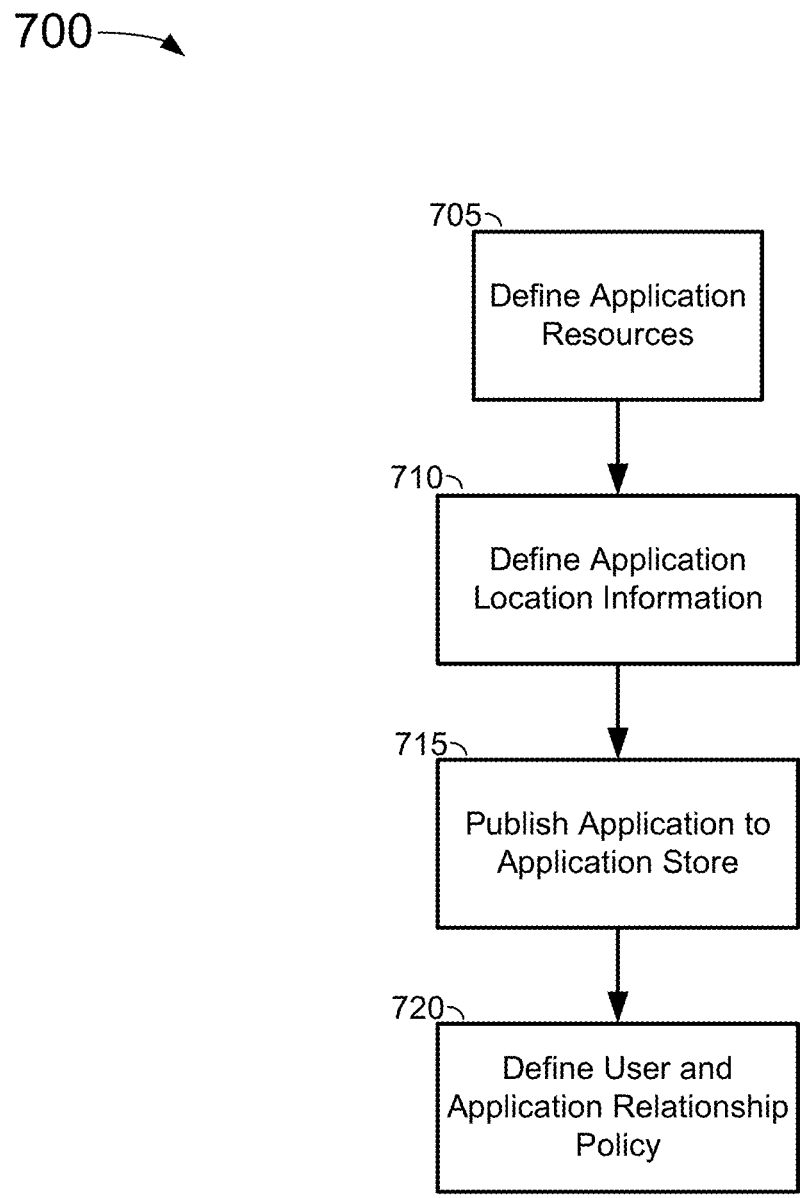
FIG. 7 is a flow diagram illustrating an application publication process, in accordance with at least one example of the present disclosure.

To establish and store the metadata associated with each application, including the location information for each application, the metadata can be tagged or otherwise associated with the application when the application is added to the application store. In some examples, an application can be updated to include new or revised application location information such that the metadata associated with the application is updated regularly. FIG. 7 shows a flow chart illustrating process 700 that includes defining application resources and location information. In certain examples, an application service such as application service 102, working in concert with an application store such as application store 110, can implement some or all of process 700 as shown in FIG. 7 and described below.

As shown in FIG. 7, process 700 can include defining 705 one or more application resources. For example, application resources can include physical resources such as required input devices, required memory, required hard drive or other storage access, required display or other outputs, and other similar resources that may be associated with or required by a specific application. Additionally, the resources can include application store information such as application type, application group information, any associated fee information for using an application, and other similar store information.

Figure 8:
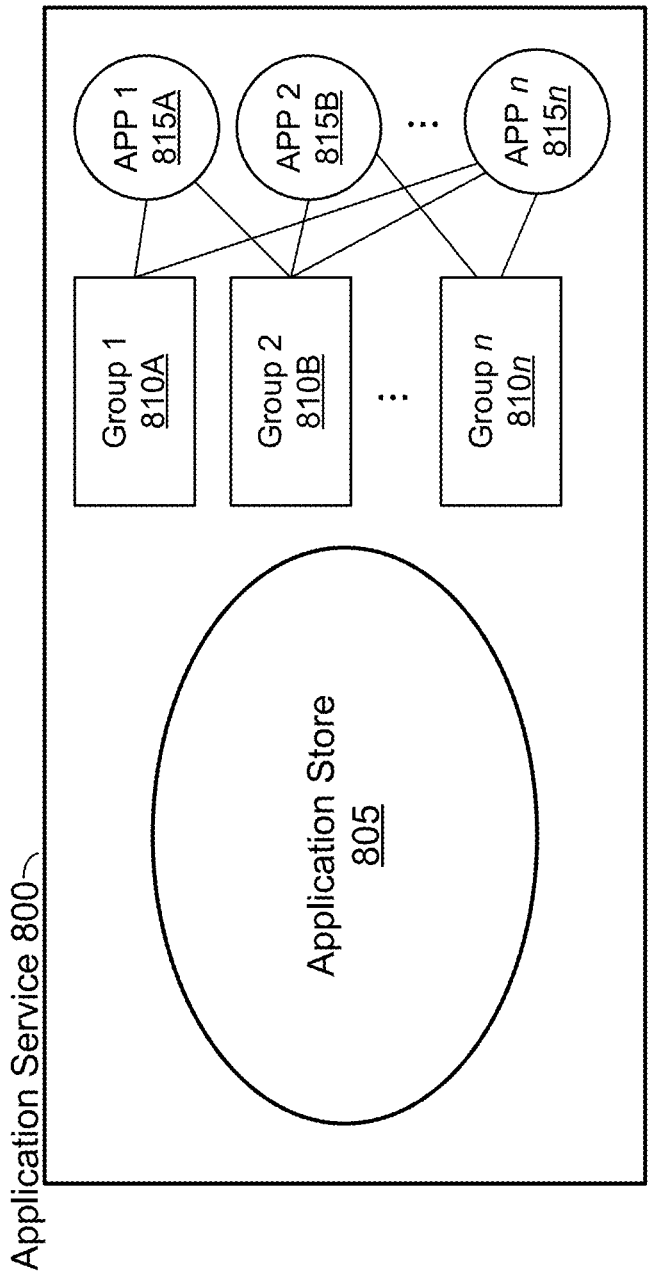
FIG. 8 is a block diagram of a sample application service including an application store, in accordance with at least one example of the present disclosure.

FIG. 8 illustrates a sample application service 800 having an associated application store 805 as described herein. As shown in FIG. 8, the application store 805 can be configured to store information related to all available applications for, for example, a given distributed workspace. In certain implementations, the application store 805 can include a hierarchy or other similar structure for organizing applications. For example, each application can be configured to be independently available or as part of a group of applications as contained within the application store 805.

For example, as shown in FIG. 8, the application store 805 can include various groups of applications, in this example listed as Group 1 810A through Group n 810n. In certain examples, each application group can include a different set of applications. For example, each of applications APP 1 815A, APP 2 815B, and APP n 815n can belong to a different group and be grouped together with other applications. For example, as shown in FIG. 8, Group 1 810A can include APP 1 815A and APP n 815n. Similarly, Group 2 810B can include APP 1 815A, APP 2 815B, and APP n 815n. As further shown in FIG. 8, Group n 810n can include APP 2 815B and APP n 815n.

In some examples, the applications can be organized into groups in the application store 805 according to particular similarities. For example, each application in any of the individual groups can have common location information for accessing the application. To continue the above examples, each application in Group 1 810A can have associated location information that indicates the applications can be accessible by a computing device located anywhere, each application in Group 2 810B can have associated location information that indicates each application is available to a computing device when the computing device is within a particular range of a set of GPS coordinates, and each application in Group n 810n can have associated location information that indicates each application is available to a computing device when the computing device connected to a particular network such as a specific Wi-Fi network.

Referring back to FIG. 7, process 700 can further include defining 710 application location information as described herein. The location information can include various details related to where an associated application can be accessed. For example, the location information can include a specific geographic location and range (e.g., within 1 mile of specific GPS coordinates). In another example, the location information can include network information such as a Wi-Fi network ID. In another example, the location information can be provided as a set of boundaries drawn on a map as lines or as a set of points on the map that are translated into a set of boundaries that define a geographic location in which an application can be accessed. For example, the boundaries can define a particular city, a portion within a city such as a specific block, a building, a general area within a building, and other similarly defined areas. In some examples, the boundaries can include additional dimensional information such as a specific floor in a building. For example, for a store in a shopping mall, the store can include boundary information defining the store location when viewed from above as well as floor information to define the store location when the shopping mall is viewed from the side.

As further shown in FIG. 7, process 700 can further include publishing 715 the application to the application store. This can include submission of an application template that includes, for example, application data such as information regarding storage of the application, application status information, the application resource information, the application location information, and other similar application information. Depending upon the application store, the published application may go through an automated or manual review process and the application can be made accessible to one or more users of, for example, a distributed workspace. Additionally, process 700 can include defining 720 a user and application relationship policy. The user and application relationship policy can include, for example, user requirements for accessing the application (e.g., both physical device requirements as well as user authorization requirements).

Figure 9:
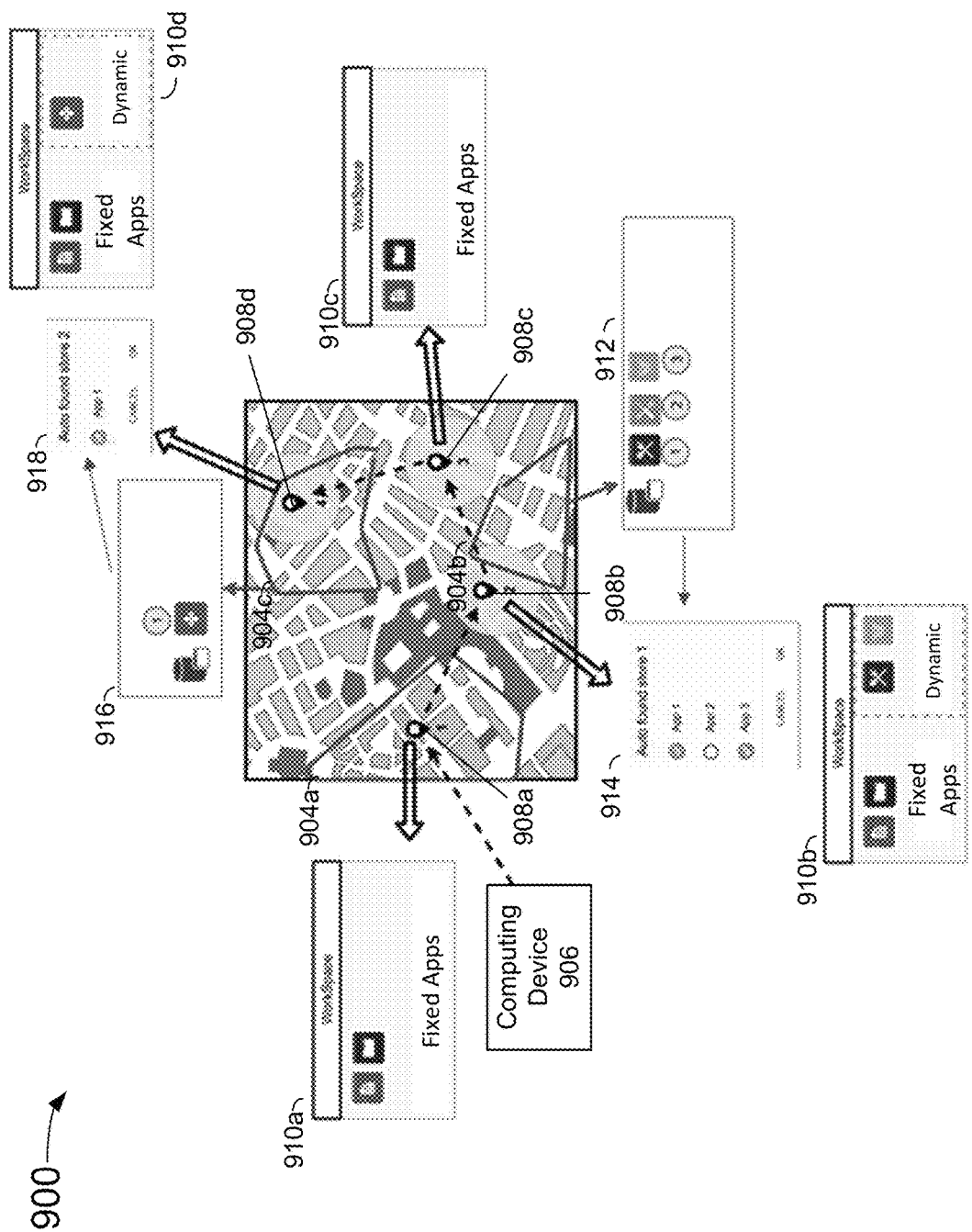
FIG. 9 is a drawing of a map and several sample interface views illustrating location-based application services, in accordance with at least one example of the present disclosure.

As generally described above, location-based application discovery can be used to provide a user with a distributed workspace that includes a set of dynamic applications that can vary depending upon the current location of the user. FIG. 9 illustrates a sample overview 900 of a computing device moving through various geographically or previously defined areas on a map and how location-based application discovery as described herein can provide an enhanced user experience for the user of the computing device.

As shown in FIG. 9, a map 900 can include various specific geographical regions 904a, 904b, and 904c. As described above, each of the geographical regions can be defined based upon a set of lines or coordinates overlaid on a map such as map 900. In other examples, a geographic region can be defined by known geographic features such as city limits, neighborhood borders, building walls, rivers and other natural features, and other similar geographic features.

As further shown in FIG. 9, a computing device 906 associated with, for example, a user can move through the map 900 as represented by the dashed arrows placed throughout the map. During the movement, the computing device 906 can come within range of one or more of the geographical regions 904a, 904b, and 904c. Initially, as shown in FIG. 9, the computing device 906 is located at position 908a and within geographical region 904a. During this time, the computing device can access a distributed workspace 910a. As shown in FIG. 9, workspace 910a includes a set of fixed applications.

At some point in time, the computing device 906 can move from position 908a to position 908b and provide updated location information to the application service of the distributed workspace system (e.g., provide updated GPS information). At position 908b, the computing device 906 can be within range of geographical region 904b. As shown in FIG. 9, geographical region 904b is associated with a set of location-based applications 912. In order to provide a set of applications to the computing device 906, the application service can determine which, if any, of the applications 912 are to be provided to the computing device 906. For example, in order to receive some applications 912, the user of the computing device 906 may require a subscription to a particular service or to have previously purchased the application. The application service can determine which, if any, applications 912 the user has access to and create a listing 914 of applications to be provided to the computing device 906. As shown in FIG. 9, workspace 910b can be updated to include the location-based applications 912 that were included on the listing 914. The user of the computing device 906 can access the workspace 910b while in or near (e.g., within 50 feet of) geographical region 904b.

As the computing device 906 continues to move through the map 900, the computing device can move to position 908c and provide updated location information to the application service of the distributed workspace system (e.g., provide updated GPS information). As shown in FIG. 9, at position 908c, the computing device is not within, or in range of, any of the defined geographical regions 904a, 904b, or 904c. As such, at position 908c, the computing device can display workspace 910c which includes the set of fixed applications and no location-based applications.

As further shown in FIG. 9, the computing device 906 can move to a fourth position 908d. and provide updated location information to the application service of the distributed workspace system (e.g., provide updated GPS information). At position 908d, the computing device 906 is within geographical region 904c. As shown in FIG. 9, geographical region 904c is associated with a set of location-based applications 916. In order to provide a set of applications to the computing device 906, the application service can determine which, if any, of the applications 916 are to be provided to the computing device 906 and create a listing 918 of applications to be provided to the computing device 906. As shown in FIG. 9, workspace 910d can be updated to include the location-based applications 916 that were included on the listing 918. The user of the computing device 906 can access the workspace 910d while in or near (e.g., within 50 feet of) geographical region 904c.

It should be noted that the map and sample geographical regions as shown in FIG. 9 are provided by way of example only. In some examples, as noted above, the defined geographical regions can be more detailed or precise such as a floor of a building or a room within a building. In such examples, more specific location information such as network connectivity information or Bluetooth beacon connectivity information can be used to provide a more detailed position that can be obtained through GPS coordinates.

Figure 10:
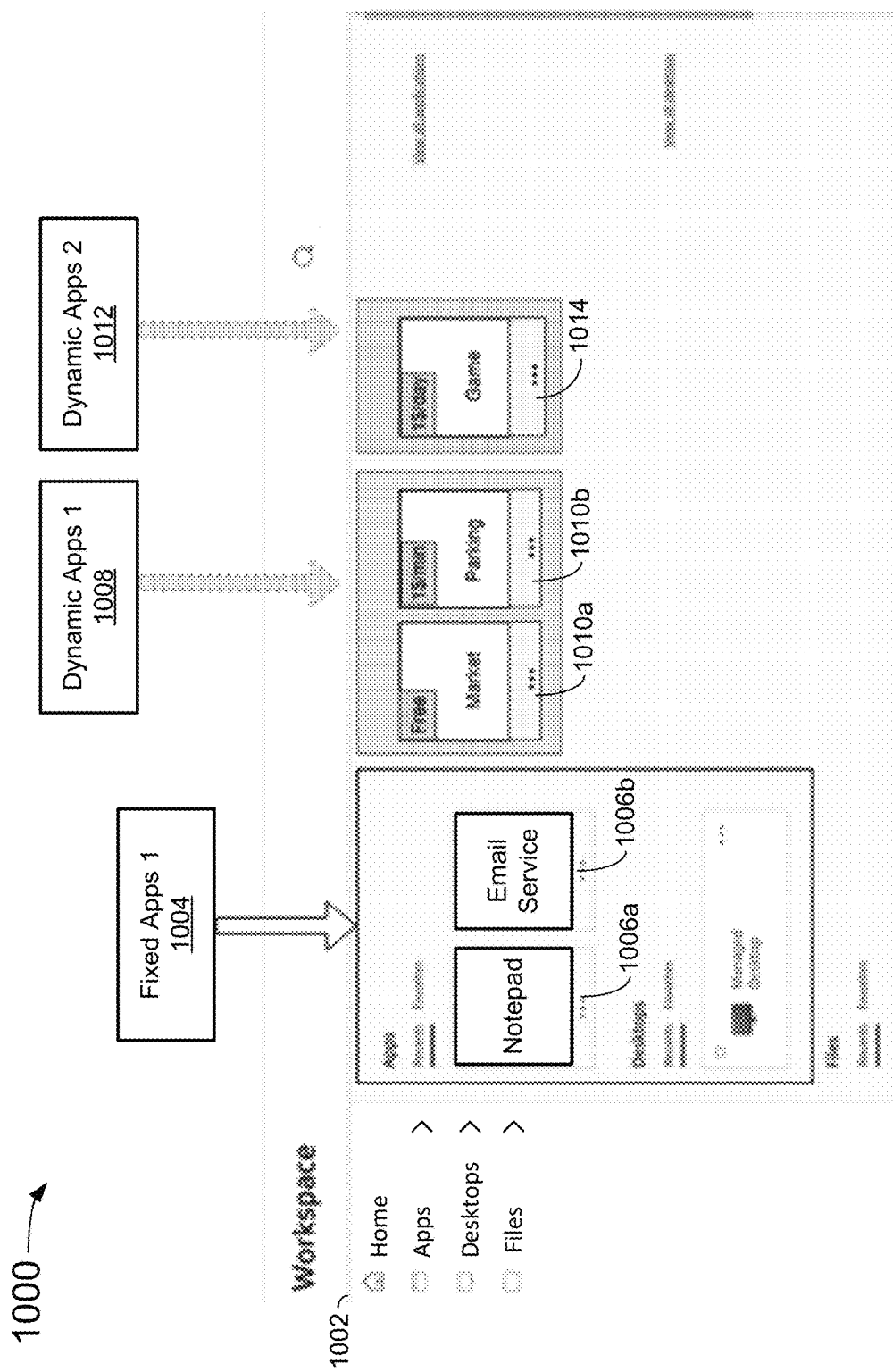
FIG. 10 is a sample view of an example user interface for a distributed workspace that includes location-based application discovery, in accordance with at least one example of the present disclosure.

FIG. 10 illustrates a sample view of a workspace 1000. In some examples, workspace 1000 can represent workspaces 910a, 910b, 910c, and 910d as described above in the discussion of FIG. 9. As shown in workspace 1000, a directory 1002 can be included for easier navigation of the workspace. For example, the directory 1002 can be arranged as a hierarchical tree and include navigation inputs for home, applications, desktops, and files. The workspace 1000 can also include a set of fixed applications 1004. As noted above, the fixed applications can include applications that are not location-based and are provided in the workspace at all times. For example, the set 1004 can include a text editing application such as a notepad 1006a and an email service 1006b. It should be noted that the fixed applications as shown in the set 1004 are provided by way of example only. In some implementations, the set 1004 can include various fixed applications such as a spreadsheet editor application, a presentation application, a chat application, an image viewer application, a calculator application, and other similar and common applications that are generally not associated with any specific location as described herein.

As further shown in FIG. 10, the workspace 1000 can include a first dynamic application set 1008. For example, the applications contained within set 1008 can be location-based and provided in the workspace 1000 when a computing device accessing the workspace enters a particular geographical region associated with the applications contained within set 1008. As shown in FIG. 10, the set 1008 can include a market application 1010a and a parking application 1010b. In some examples, an application can have an associated cost. For example, as shown in FIG. 10, parking application 1010b includes a fee of one dollar per minute to access parking. A user of the computing device accessing workspace 1000 can have a previously set up account for paying for a particular application or can access payment information within the individual application.

As also shown in FIG. 10, the workspace 1000 can include a second dynamic application set 1012. For example, the applications contained within set 1012 can be location-based and provided in the workspace 1000 when a computing device accessing the workspace enters a particular geographical region associated with the applications contained within set 1012. As shown in FIG. 10, the set 1012 can include a game application 1014. As noted above, individual applications can have an associated fee that requires payment by a user of the application.

It should be noted that dynamic application set 1008 and dynamic application set 1012 are shown simultaneously in workspace 1000 by way of example only. In actual implementation, depending upon the current location of the computing device accessing workspace 1000, only one of the dynamic application sets may be shown at the same time. However, in some examples, depending upon the applications included in each of the sets 1008 and 1012 and the current location of the computing device accessing the workspace 1000, both dynamic application sets can be displayed. For example, set 1008 can be a set of dynamic applications associated with a building such as a shopping mall. When a computing device is within the shopping mall, applications associated with the shopping mall such as a parking application, a map application, an events calendar application, and other similar applications can be included in set 1008 and provided to the user in workspace 1008. In addition, set 1012 can include one or more dynamic applications that are associated with a particular location within the shopping mall. For example, the set 1012 can include one or more applications associated with restaurants within a food court in the shopping mall. When the computing device accessing the workspace 1000 enters the food court, set 1012 can be added to the workspace to provide access to one or more applications associated with individual restaurants within the food court.

It should also be noted that the layout and applications as shown in workspace 1000 is provided by way of example only. Depending upon the available resources and implementation of workspace 1000 (e.g., whether on a laptop computing device, a tablet computing device, a smartphone, or other similar computing devices) the layout and accessibility of the workspace may be altered to accommodate the display and functions of the computing device accessing the workspace 1000.

Having thus described several aspects of at least one example, it is to be appreciated that various alterations, modifications, and improvements will readily occur to those skilled in the art. For instance, examples disclosed herein can also be used in other contexts. Such alterations, modifications, and improvements are intended to be part of this disclosure and are intended to be within the scope of the examples discussed herein. Accordingly, the foregoing description and drawings are by way of example only.

Also, the phraseology and terminology used herein is for the purpose of description and should not be regarded as limiting. Any references to examples, components, elements or acts of the systems and methods herein referred to in the singular can also embrace examples including a plurality, and any references in plural to any example, component, element or act herein can also embrace examples including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" can be construed as inclusive so that any terms described using "or" can indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

What is claimed is:

1. A computer system for providing location-based application access, the system comprising a first server computer that includes:
   a memory;
   a network interface; and
   at least one processor coupled to the memory and the network interface and configured to
      receive, from a client agent via the network interface, a connection request for access to a distributed workspace, the connection request comprising location information for a client device;
      access, from the memory, metadata for each of a plurality of applications, wherein the metadata comprises location information for each of the plurality of applications defining at least one physical location where each of the plurality of applications can be accessed;
      compare the location information for the client device against the metadata for each of the plurality of applications;
      identify a first particular one of the plurality of applications having location information that encompasses the location information for the client device;
      in response to identifying the first particular application, transmit, via the network interface, to a second server computer, instructions to launch a virtual instance of the first particular application using a virtualization agent hosted by the second server computer, wherein the second server computer also hosts the first particular application;
      after transmitting the instructions to launch the virtual instance of the first particular application, receive, from the client agent, an access request for the first particular application, wherein the virtual instance of the first particular application is launched by the virtualization agent at the second server computer before the client agent requests access to the first particular application; and responsive to receiving the access request, establish a connection between the virtualization agent hosted by the second server computer and the client agent, thereby providing the client agent with access to the previously launched virtual instance of the first particular application.

2. The computer system of claim 1, wherein the at least one processor is further configured to:
receive, from the client agent via the network interface, updated location information for the client device.

3. The computer system of claim 2, wherein the at least one processor is further configured to:
in response to receiving the updated location information for the client device, identify a second particular one of the plurality of applications having location information that encompasses the updated location information for the client device.

4. The computer system of claim 3, wherein the at least one processor is further configured to:
compare the updated location information for the client device against the metadata for each of the plurality of applications; and
in response to identifying the second particular application, establish a connection between the client agent and an application service hosted by a third server computer that also hosts the second particular application.

5. The computer system of claim 1, wherein the memory comprises an application store configured to store at least one of the plurality of applications.

6. The computer system of claim 5, wherein the application store is organized into a plurality of application groups, each of the plurality of application groups comprising group location information for defining at least one physical location where each of a plurality of applications in a particular group can be accessed from.

7. The computer system of claim 1, wherein the location information for the client device comprises at least one of global positioning system information and network connection information.

8. A non-transitory computer readable medium storing computer executable instructions to provide location-based application access, the computer executable instructions comprising instructions to:
receive, by at least one first processor at a first server computer, a connection request from a client agent via a network interface operably coupled to the at least one first processor for access to a distributed workspace, the connection request comprising location information for a client device;
access, by the at least one first processor, metadata for each of a plurality of applications from a memory operably coupled to the at least one first processor, wherein the metadata comprises location information for each of the plurality of applications defining at least one physical location where each of the plurality of applications can be accessed from;
compare, by the at least one first processor, the location information for the client device against the metadata for each of the plurality of applications;

identify, by the at least one first processor, a first particular one of the plurality of applications having location information that encompasses the location information for the client device;
in response to identifying the first particular application, transmit, via the network interface, to a second server computer, instructions to launch a virtual instance of the first particular application using a virtualization agent hosted by the second server computer, wherein the second server computer also hosts the first particular application;
after transmitting the instructions to launch the virtual instance of the first particular application, receive, from the client agent, an access request for the first particular application, wherein the virtual instance of the first particular application is launched by the virtualization agent at the second server computer before the client agent requests access to the first particular application; and
responsive to receiving the access request, establish a connection between the virtualization agent hosted by the second server computer and the client agent, thereby providing the client agent with access to the previously launched virtual instance of the first particular application.

9. The computer readable medium of claim 8, wherein the computer executable instructions further comprise instructions to:
receive, by the at least one first processor, updated location information for the client device from the client agent via the network interface.

10. The computer readable medium of claim 9, wherein the computer executable instructions further comprise instructions to:
in response to receiving the updated location information for the client device, identifying, by the at least one first processor, a second particular one of the plurality of applications having location information that encompasses the updated location information for the client device.

11. The computer readable medium of claim 10, wherein the computer executable instructions further comprise instructions to:
compare, by the at least one first processor, the updated location information for the client device against the metadata for each of the plurality of applications; and
in response to identifying the second particular application, establish, by the at least one first processor, a connection between the client agent and an application service hosted by a third server computer that also hosts the second particular application.

12. The computer readable medium of claim 8, wherein the memory comprises an application store configured to store at least one of the plurality of applications.

13. The computer readable medium of claim 12, wherein the application store is organized into a plurality of application groups, each of the plurality of application groups comprising group location information for defining at least one physical location where each of a plurality of applications in a particular group can be accessed from.

14. A method of providing location-based application access, the method comprising:
receiving, at a first server computer, from a client device, via a network interface, a connection request for access to a distributed workspace, the connection request comprising client device location information that defines a client device location;

accessing metadata that defines, for each of a plurality of applications, a physical region within which the corresponding application is accessible;

comparing the client device location information with the metadata for each of the plurality of applications;

identify a particular one of the plurality of applications having metadata that defines a physical region that encompasses the client device location;

in response to identifying the particular application, transmit, via the network interface, from the first server computer to a second server computer, instructions to launch a virtual instance of the particular application using a virtualization agent hosted by the second server computer, wherein the second server computer also hosts the particular application;

after transmitting the instructions to launch the virtual instance of the particular application, receive, from the client device, an access request for the particular application, wherein the virtual instance of the particular application is launched by the virtualization agent at the second server computer before the client device requests access to the particular application; and responsive to receiving the access request, establish a connection between the virtualization agent hosted by the second server computer and the client device, thereby providing the client device with access to the previously launched virtual instance of the particular application.

15. The method of claim 14, further comprising:

receiving, from the client device, updated client device location information that defines an updated client device location.

16. The method of claim 14, further comprising:

receiving, from the client device, updated client device location information that defines an updated client device location;

making a determination that the particular application is not accessible at the updated client device location; and in response to making the determination, transmitting, via the network interface, from the first server computer to the second server computer, instructions to terminate the virtual instance of the particular application.

* * * * *